(12) United States Patent
Von Saint-George et al.

(10) Patent No.: US 10,994,643 B2
(45) Date of Patent: May 4, 2021

(54) HEADREST WITH SPEAKERS

(71) Applicant: Harman International Industries, Incorporated, Stamford, CT (US)

(72) Inventors: Matthias Von Saint-George, Pfinztal (DE); Brian Sterling, Farmington Hills, MI (US); Kyle Concessi, Wixom, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/054,113

(22) Filed: Aug. 3, 2018

(65) Prior Publication Data
US 2019/0039492 A1 Feb. 7, 2019

Related U.S. Application Data

(60) Provisional application No. 62/541,371, filed on Aug. 4, 2017.

(51) Int. Cl.
*B60N 2/879* (2018.01)
*B60R 11/02* (2006.01)
*B60R 11/00* (2006.01)

(52) U.S. Cl.
CPC .......... *B60N 2/879* (2018.02); *B60R 11/0217* (2013.01); *B60R 2011/0017* (2013.01)

(58) Field of Classification Search
CPC ........ H04R 1/025; B60N 2/879; B60N 2/803; B60N 2/806; B60N 2/891; B60N 2/897; B60N 2002/905; B60R 11/0217; B60R 11/0017
See application file for complete search history.

(56) References Cited

U.S. PATENT DOCUMENTS

| 4,042,791 | A | * | 8/1977 | Wiseman | H04R 5/023 381/109 |
| 5,687,246 | A | * | 11/1997 | Lancon | B60R 11/0217 381/386 |
| 6,991,289 | B2 | | 1/2006 | House | |
| RE41,384 | E | | 6/2010 | House | |
| 9,682,641 | B1 | * | 6/2017 | Subat | H04R 1/023 |
| 10,239,432 | B2 | * | 3/2019 | Subat | B60N 2/879 |
| 10,730,422 | B2 | * | 8/2020 | Oswald | B60R 11/0217 |
| 2003/0081795 | A1 | * | 5/2003 | Hirao | B60N 2/879 381/86 |
| 2012/0008806 | A1 | | 1/2012 | Hess | |

(Continued)

FOREIGN PATENT DOCUMENTS

| EP | 2840568 A1 | 2/2015 |
| JP | H07264689 A | 10/1995 |
| JP | 2002191469 A | 7/2002 |

*Primary Examiner* — Fan S Tsang
*Assistant Examiner* — Angelica M McKinney
(74) *Attorney, Agent, or Firm* — Brooks Kushman P.C.

(57) ABSTRACT

A head restraint assembly is provided having a head restraint with a forward contact surface. At least one loudspeaker driver is embedded in the head restraint and offset rearward from the forward contact surface. A waveguide extends from the loudspeaker driver toward the forward contact surface and is configured to direct a sound output from the loudspeaker driver at a listening direction being different than a central axis of radiation of the loudspeaker driver.

20 Claims, 3 Drawing Sheets

(56) References Cited

U.S. PATENT DOCUMENTS

| | | | |
|---|---|---|---|
| 2015/0201260 A1* | 7/2015 | Oswald | H04R 1/025 |
| | | | 381/86 |
| 2016/0137106 A1* | 5/2016 | Subat | B60N 2/879 |
| | | | 381/389 |
| 2017/0267138 A1* | 9/2017 | Subat | B60N 2/885 |
| 2019/0111820 A1* | 4/2019 | Subat | H04R 1/025 |

* cited by examiner

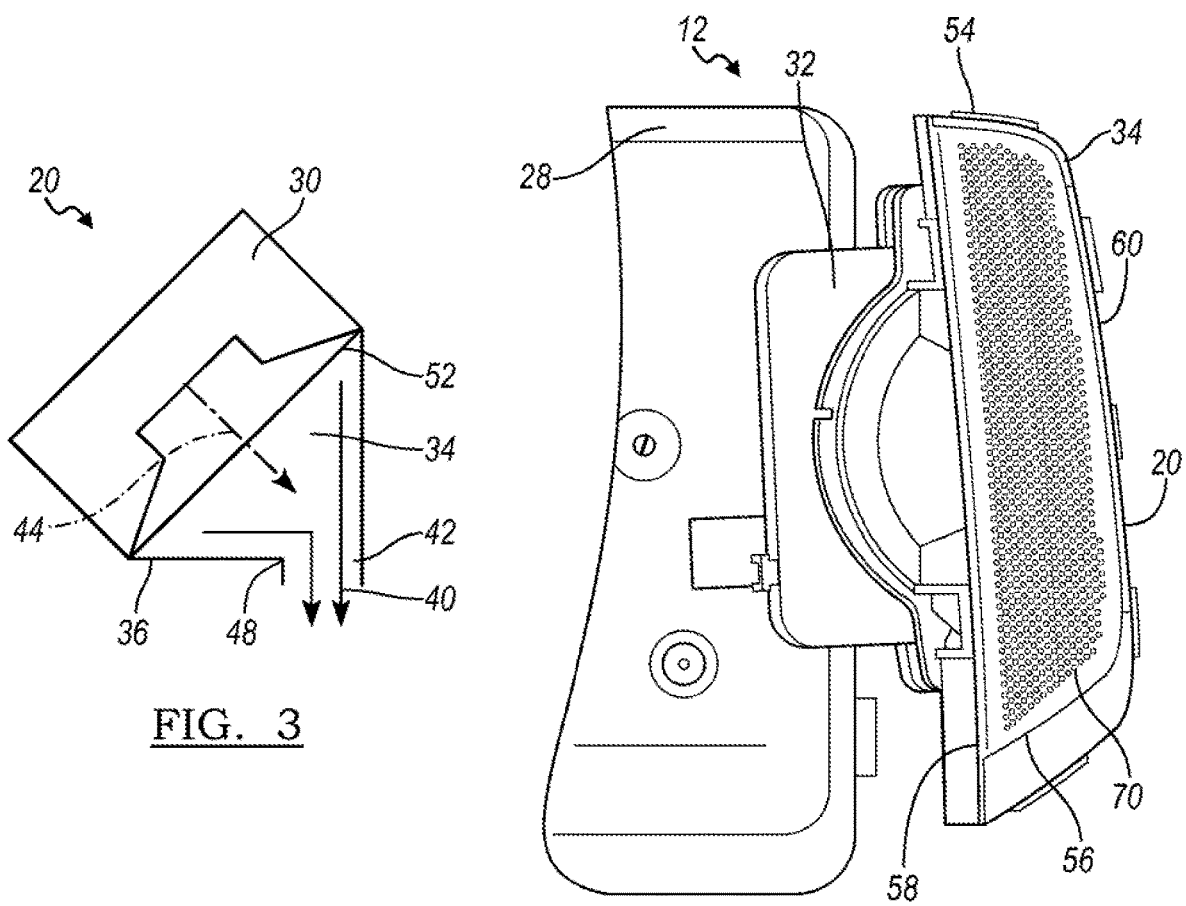
FIG. 3
FIG. 4
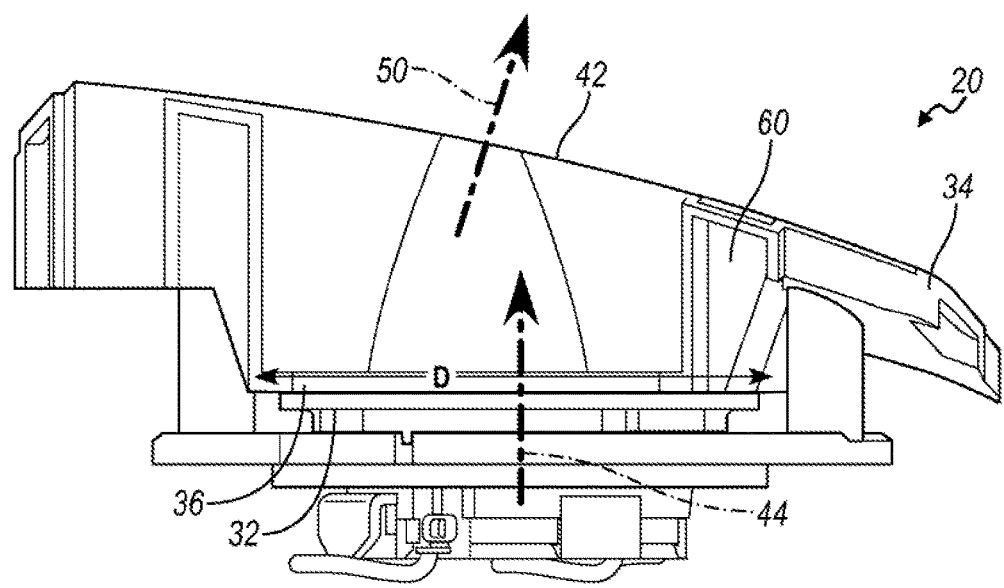
FIG. 5

HEADREST WITH SPEAKERS

CROSS-REFERENCE TO RELATED APPLICATIONS

This application claims the benefit of U.S. provisional application Ser. No. 62/541,371 filed Aug. 4, 2017, the disclosure of which is hereby incorporated in its entirety by reference herein.

TECHNICAL FIELD

An audio system and loudspeaker for use in a headrest.

BACKGROUND

It may be desirable to mount speakers in the seatbacks or headrests of seats in a vehicle or a theater. Speakers mounted in a seat may reproduce audio such as music or movie content, audible navigational, or other instructions. One example of a seat with speakers is U.S. Pat. No. 6,991,289 by Harman International industries, Incorporated.

SUMMARY

According to at least one embodiment, a head restraint assembly is provided having a head restraint with a forward contact surface. At least one loudspeaker driver is embedded in the head restraint and offset rearward from the forward contact surface. A waveguide extends from the loudspeaker driver toward the forward contact surface and is configured to direct a sound output from the loudspeaker driver at a listening direction being different than a central axis of radiation of the loudspeaker driver.

In another embodiment, the waveguide is connected to the loudspeaker driver at a first end and extends to a second end of the waveguide having an exit opening that is adjacent the forward contact surface of the head restraint.

In another embodiment, the exit opening has a central opening axis that that extends in the listening direction at an angle being non-perpendicular to a fore-aft direction of the head restraint.

In another embodiment, the exit opening has a central opening axis that that extends in the listening direction at a converging angle that converges toward a centerline of the head restraint.

In another embodiment, the exit opening has a height dimension greater than a width dimension.

In another embodiment, the exit opening is covered with at least one a trim layer or a cushion layer.

According to at least one other embodiment, a loudspeaker assembly for mounting in a head restraint is provided. The loudspeaker assembly has a pair of loudspeaker drivers mounted spaced apart from each other and oriented so that a central axis of radiation of each of the loudspeaker drivers diverges from a centerline between the pair of loudspeaker drivers. The loudspeaker assembly has a pair of waveguides, one of the pair of waveguides extending from each loudspeaker driver and configured to direct a sound output at a listening direction being different than the central axis of radiation of the loudspeaker driver.

In another embodiment, each waveguide has a bend between a first end and a second exit opening.

In another embodiment, the pair of loudspeaker drivers are spaced apart in width direction, wherein each waveguide has an exit opening with a height dimension greater than a width dimension.

In another embodiment, the first end has a generally circular opening.

In another embodiment, an exit opening area is greater than a first opening area.

According to at least one other embodiment, a head restraint assembly is provided having a head restraint having a forward contact surface. A pair of loudspeaker drivers is embedded in the head restraint and offset from the forward contact surface. A pair of waveguides is provided. One of the pair of waveguides extends from each loudspeaker driver toward the forward contact surface.

In another embodiment, a central axis of radiation of each loudspeaker driver extends at an angle being non-parallel to a centerline of the head restraint.

In another embodiment, the central axis of radiation of each loudspeaker driver extends at an angle that diverges from a centerline of the head restraint.

In another embodiment, each waveguide has an exit opening position adjacent the forward contact surface of the head restraint, wherein each of the exit openings has a central axis that is oriented at an angle converging toward the centerline of the head restraint.

In another embodiment, each waveguide is connected to the speaker at a first end and extends to a second end of the waveguide that is adjacent the forward contact surface of the head restraint.

In another embodiment, the second end has an exit opening area that is at least 15% greater than a first opening area at the first end.

In another embodiment, a pair of speaker enclosures are embedded in the head restraint. One of the pair of speaker enclosures is connected to each loudspeaker opposite the waveguide.

BRIEF DESCRIPTION OF THE DRAWINGS

FIG. 3 is a detailed schematic view of the speaker modules of FIGS. 1-2.

FIG. 4 is a detailed perspective view of a portion of the head restraint with the speaker module.

FIG. 5 is a detailed side view of the speaker module in FIG. 4.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Automotive sound systems benefit from an individual sound reproduction for each passenger. Speaker locations in the headrest tend to provide a better seat-to-seat separation. For example, the driver can be listening to navigation information while the other passengers can listen to music. Also, surround content reproduction can benefit from individual reproduction, where each passenger gets exactly the surround content required to recreate the original surround sound from the recording in the automotive environment. Speakers in the head restraint (or also referred to as a headrest) can be used to create personal sound envelopment.

Acoustically, speakers in the head restraint along the contact surface may have the advantage that mainly the person sitting in the seat may hear sound from the speaker without disturbing other passengers. The speakers, however, in the head restraint on the contact surface may be close to the occupant's head. Because of that, variation in sound may be large depending on head position. Also, the speakers in the head restraint on the contact surface may be covered by occupant's head.

Figure 1:
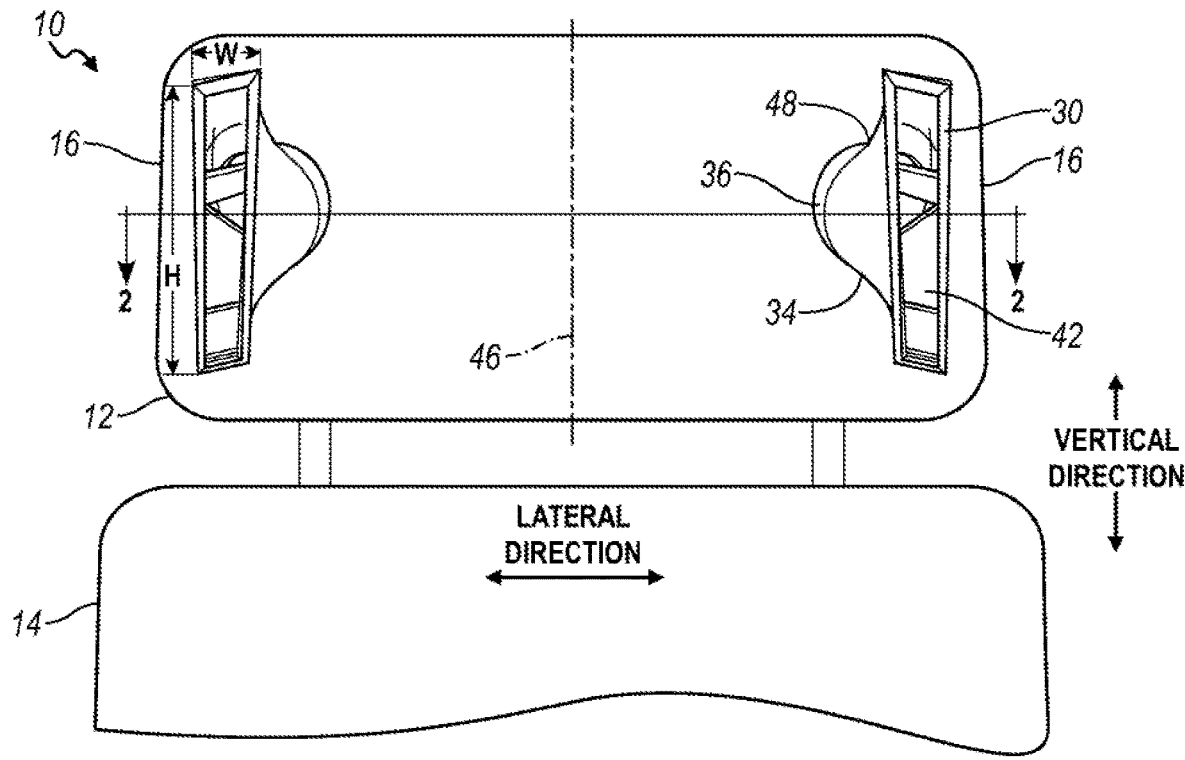
FIG. 1 is a schematic front view of a seat assembly having a head restraint with speaker modules according to one embodiment.
Figure 2:
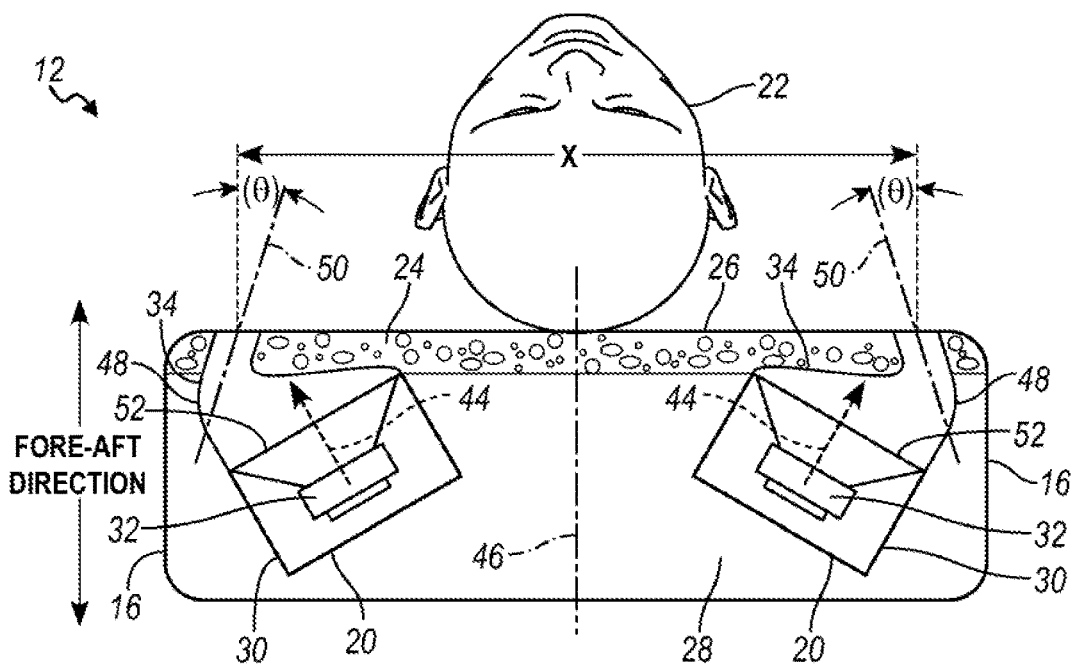
FIG. 2 is a schematic top section view of the head restraint with speaker modules through section 2-2 in FIG. 1.

The figures illustrate a loudspeaker system integrated along the sides of automotive head restraints to optimize acoustical performance. FIGS. 1 and 2 schematically illustrate a seat assembly 10 having a head restraint 12 mounted to a seat back 14. Speaker modules 20 are mounted in the head restraint 12. As shown in FIG. 1, the speaker modules 20 are spaced apart in a lateral direction and are mounted adjacent lateral sides 16 of the head restraint 12. By mounting the speaker modules 20 adjacent the lateral sides 16, the speaker modules 20 are positioned away from the occupant's head 22 that is adapted to be centered on the head restraint 12. Additionally, by spacing the speaker modules 20 apart by a distance in the lateral direction, sound variations to the occupant 22 are minimized. The speaker modules 20 are generally level in the upright/vertical direction.

As shown in FIG. 2, the speaker modules 20 are mounted behind a forward contact surface 26, against which an occupant's head 22 may rest against. The speaker modules 20 are mounted on a central core 28 of the head restraint 12. The head restraint core 28 may be covered with a cushion layer 24 that defines the contour of the forward contact surface 26.

FIG. 3 illustrates the speaker module 20 in more detail. The speaker module 20 includes a loudspeaker driver 32 mounted in a sealed enclosure 30. A waveguide 34 is mounted in front of loudspeaker driver 32 and extends from the loudspeaker driver 32 toward the forward contact surface 26 of the head restraint 12. The loudspeaker driver 32 may be mounted behind the cushion 24. By mounting the loudspeaker driver 32 behind the cushion 24, the occupant's head does not contact the loudspeaker driver 32.

The loudspeaker driver 32 has a central axis of radiation 44. Unlike some speakers mounted in head restraints where the loudspeaker driver 32 is facing forward such that the central axes are parallel to a centerline of a head restraint, the central axis of radiation 44 of each of the loudspeaker driver 32 diverges away from a centerline 46 of the head restraint 12. As such, the central axis of radiation 44 of the driver 32 extends at an angle that is non-parallel to the centerline 46 of the head restraint. Similarly, the central axis of radiation 44 is generally non-perpendicular to the forward contact surface 26 and generally non-perpendicular to a fore-aft direction of the head restraint 12.

The waveguide 34 has a bent-shape to direct acoustical paths 40 from loudspeaker driver 32 toward the forward contact surface 26 of the head restraint 12 and toward the occupant's bead 22. The waveguide 34 has a first opening 36 positioned adjacent to the loudspeaker driver 32. The waveguide 34 extends to a second exit opening 42 adjacent to the forward contact surface 26 of the head restraint 12. The waveguide 34 has a bend 48 between the first opening 36 and the second exit opening 42. The exit opening 42 may be on the periphery of the forward contact surface 26, or form a portion of the perimeter of the forward contact surface 26.

As best shown in the section views in FIGS. 2 and 3, the waveguide 34 has a bend 48 between the first opening 36 and the exit opening 42. The center axis 50 of the exit opening 42 extends at an angle θ that converges toward the centerline 46 of the head restraint 12. The converging angle θ is based on a distance X between the center axes 50 of the exit openings 42 of the pair of speakers. In one embodiment, the angle θ is based on the transfer function $\theta = X*(4/7)-90$. For example, when the distance X between the center axes 50 of the exit openings 42 is 200 mm, θ is approximately 24°. In another embodiment, the distance X between the center axes 50 of the exit openings 42 is at least 157 mm. If waveguides are used to direct the sound to an exit opening, the speakers 20 can be placed any distance to each other as long as the enclosure volume is maintained. The lateral distance X of the may vary based on the head restraint design or other variables, for example.

FIGS. 4 through 7 show perspective views of a speaker module 20, according to one embodiment, in greater detail.

FIG. 4 illustrates a perspective view of a portion of the head restraint 12 and one speaker module 20. The outer layers of the head restraint, such as the cushion and trim material, are not shown in order to illustrate the speaker module 20 mounted on the head restraint core 28.

Figure 6:
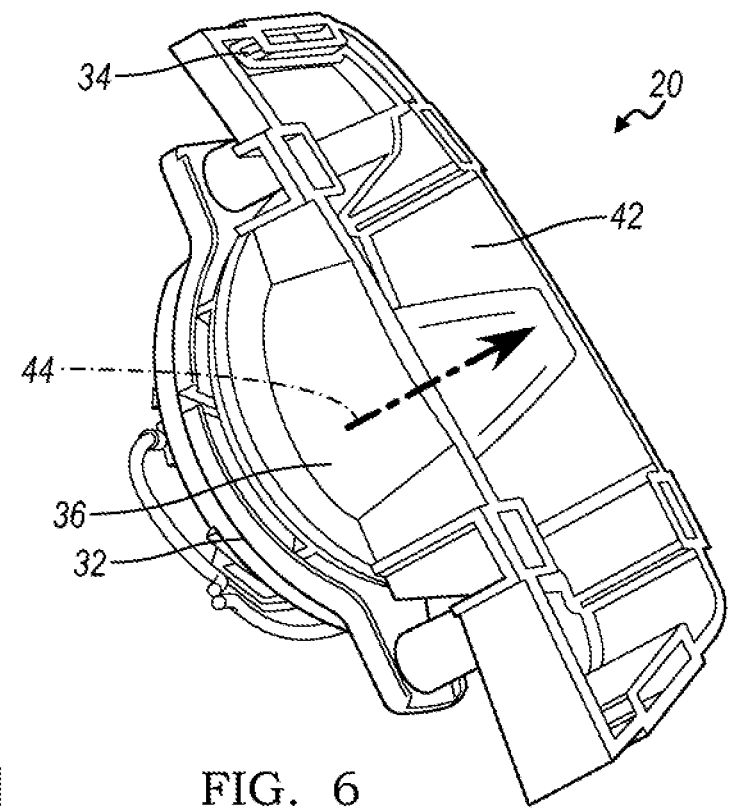
FIG. 6 is a detailed front perspective view of the speaker module in FIG. 4.
Figure 7:
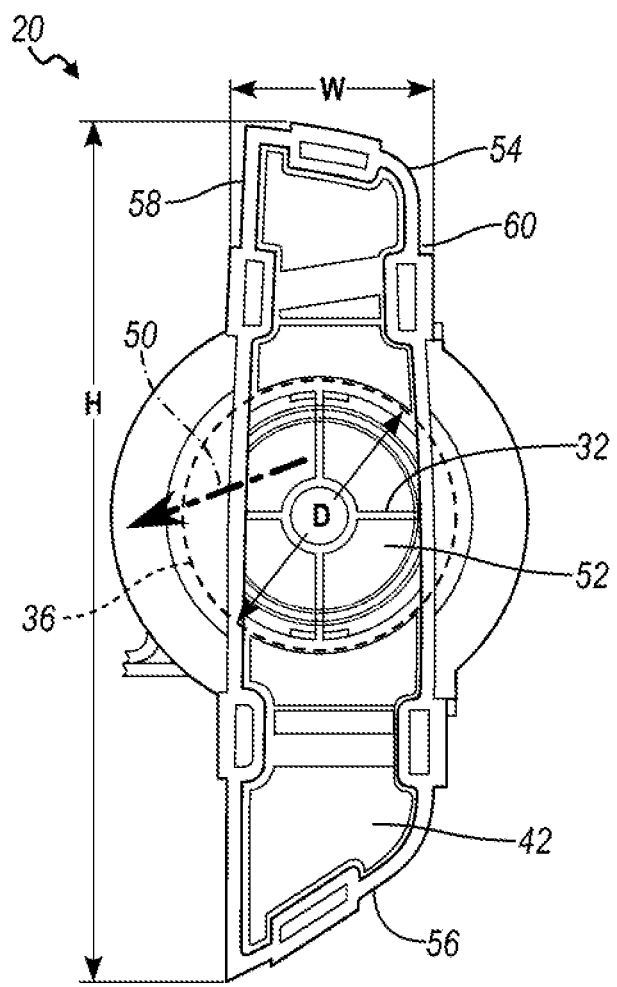
FIG. 7 is a detailed front view of the speaker module in FIG. 5.

FIGS. 5-7 illustrate the speaker module 20 removed from the head restraint. FIG. 5 illustrates a side view of the speaker module 20 which best illustrates the difference between the central axis of radiation 44 and the center axis 50 of the exit opening 42. FIG. 6 illustrates a front perspective view of the speaker module 20 that is orthogonal to the center axis 50 from the speaker driver 32. In comparison, FIG. 7 illustrates a front perspective view of the speaker module 20 that is orthogonal to the central axis of radiation 44 from the speaker driver 32.

FIGS. 4 through 7 show the waveguide 34 and the orientation of the first opening 36 and the exit opening 42 in perspective views. As best shown in FIGS. 4 and 7, the first opening 36 is generally circular. The first opening 36 of the waveguide 34 is shaped to generally correspond with a radiating surface 52 of the speaker. However, the first opening 36 may be any suitable shape to correspond and connect to the speaker driver 32, as a person of ordinary skill in the art understands.

As shown in detail in FIG. 7, the waveguide 34 has a circular first opening 36 with a diameter D. The exit opening 42 is a slot-shaped, elongated opening. As shown in FIG. 7, the exit opening 42 of the waveguide 34 has a height dimension H greater than a width dimension W.

The open area of the waveguide 34 normal to the direct acoustical path vectors 40 increase between the first opening 36 and the exit opening 42. The increasing opening area from the first opening 36 to the exit opening prevents waveguide 34 from acting as a resonator. An increase of open area of the waveguide 34 from the first opening 36 to the exit opening 42 also optimizes the acoustical coupling of the loudspeaker driver 32 to the air. Therefore, the area of the exit opening 42 is greater than the speaker diaphragm area and the first opening 36. In one embodiment, the area of exit opening 42 is at least 15% greater than the area of the first opening 36. In one example, the speaker diaphragm cross-sectional area is 1256 mm$^2$ and the exit opening 42 is 1500 mm$^2$.

In one embodiment, the diameter D may be in the range of 20 mm to 50 mm. In another embodiment, the loudspeaker driver 32 may be approximately 40 mm, and the first opening 36 of the waveguide 34 has a diameter D being generally the same as or slightly larger than the loudspeaker driver 32. In this embodiment, embodiment, the width W is approximately 16 mm and a height H is approximately 77 mm. In another embodiment, the first opening 36 has a diameter D of approximately 30 mm while the exit opening 42 has a height H of approximately 85 mm and a width W of approximately 22 mm. The dimensions of the speaker driver 32 and first opening 36 may vary based on the sound output requirement and head restraint design, for example. The dimensions of the height and width of the exit opening 42 may also vary based on the head restraint design and other packaging constraints, for example.

As shown in FIG. 7, the exit opening 42 may not be symmetric. An upper wall 54 may have a different width W than a lower wall 56. Similarly, an inner wall 58 may have a different height H than the outer wall 60. The walls 54, 56, 58, 60 are sloping so the height and cross-section area of the waveguide 32 increases from the first opening 36 to the exit opening 42. The slope may be formed as steep as possible. In another embodiment, the waveguide may have a slot portion with a constant cross-sectional area generally equal to the exit opening, and a conical or cylindrical portion with defining the first opening.

In some embodiments, a compression phase plug may be located between the loudspeaker driver 32 and the waveguide 34, which allows the first opening 36 to be less than the loudspeaker diaphragm area.

As shown in FIG. 4, the waveguide 34 may have a grille 70 covering the exit opening 42. The grille 70 may form a portion of an exterior surface of the head restraint 12. The grille 70 may also be covered with cushion material 24 and/or trim material based on aesthetic designs of the head restraint.

FIG. 6 illustrates a front perspective view of the speaker module 20 that is orthogonal to the center axis 50 of the exit opening 42 (the center axis 50 is not shown because it is coming out of the page). In comparison, FIG. 7 illustrates a front perspective view of the speaker module 20 that is orthogonal to the central axis of radiation 44 from the speaker driver 32 (the central axis of radiation 44 is not shown because it is coming out of the page). The waveguide 34 has a bend and/or sloping area between the first opening 36 and the exit opening 42. As such, the center axis 50 of the exit opening 42 is oriented at an angle different than that angle of radiation 44 of the speaker driver 32, as schematically shown in FIG. 5.

The exit opening 42 may be centered vertically within ear position. In at least one embodiment, the exit opening 42 may be oriented horizontally so that the longer height dimension H extends laterally across the head restraint 12. If the exit opening 42 is oriented horizontally, then the waveguides and exit opening 42 should be placed as high on the head restraint 12 as possible, along a top surface, for example. In another embodiment, the exit opening 42 should be oriented no more than 25 mm below the positioning of the ears of a 50th percentile US Male.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
a head restraint having a forward contact surface being fixed;
at least one loudspeaker driver embedded in the head restraint and offset rearward from the forward contact surface;
a waveguide extending from the loudspeaker driver toward the forward contact surface and configured to direct a sound output from the loudspeaker driver at a listening direction being different than a central axis of radiation of the loudspeaker driver,
wherein the waveguide is connected to the loudspeaker driver at a first end and extends to a second end of the waveguide having an exit opening that is along the forward contact surface of the head restraint, wherein the exit opening has a central opening axis that extends in the listening direction at a converging angle that converges toward a centerline of the head restraint.

2. The head restraint assembly of claim 1, wherein the at least one loudspeaker driver comprises two loudspeaker drivers, wherein the converging angle is proportional to a distance between the central axes of the exit openings minus 90 degrees.

3. The head restraint assembly of claim 1, wherein the central opening axis that extends in the listening direction at an angle being non-perpendicular to a fore-aft direction of the head restraint.

4. The head restraint assembly of claim 1, wherein the exit opening has a height dimension greater than a width dimension.

5. The head restraint assembly of claim 1, wherein the exit opening is covered with at least one of a trim layer or a cushion layer.

6. The head restraint assembly of claim 1, wherein a central axis of radiation the at least one loudspeaker driver extends at an angle that diverges from a centerline of the head restraint.

7. The head restraint assembly of claim 1, wherein a central axis of radiation the loudspeaker driver extends at an angle non-parallel from a centerline of the head restraint.

8. A loudspeaker assembly for mounting in a head restraint, the loudspeaker assembly comprising:
a pair of loudspeaker drivers mounted to be spaced apart from each other and oriented so that a central axis of radiation of each of the loudspeaker drivers diverges from a centerline between the pair of loudspeaker drivers; and
a pair of waveguides, one of the pair of waveguides extending from each loudspeaker driver at a first opening and configured to direct a sound output at a listening direction being through an exit opening having a central axis different than the central axis of radiation of the loudspeaker driver, wherein an area of the exit opening is greater than an area of the first opening,
wherein the exit opening extends at a converging angle that is proportional to a distance between the central axes of the exit openings minus 90 degrees.

9. The loudspeaker assembly of claim 8, wherein each waveguide has a bend between a first end and a second exit opening.

10. The loudspeaker assembly of claim 9, wherein the pair of loudspeaker drivers are spaced apart in a width direction, wherein the exit opening of each waveguide with a height dimension greater than a width dimension.

11. The loudspeaker assembly of claim 10, wherein the first end has a generally circular opening.

12. The loudspeaker assembly of claim 8, further comprising a head restraint having a forward contact surface, wherein the exit openings are positioned along a forward contact surface.

13. A head restraint assembly comprising:

a head restraint having a forward contact surface;

a pair of loudspeaker drivers embedded in the head restraint and offset from the forward contact surface, wherein a central axis of radiation of each loudspeaker driver extends at an angle that diverges from a centerline of the head restraint; and a pair of waveguides, one of the pair of waveguides extending from each loudspeaker driver toward the forward contact surface, wherein each waveguide has an exit opening having a central opening axis that is oriented at an angle converging toward the centerline of the head restraint, wherein the exit opening is positioned along the forward contact surface.

14. The head restraint assembly of claim 13, wherein a central axis of radiation of each loudspeaker driver extends at an angle being non-perpendicular to the forward contact surface.

15. The head restraint assembly of claim 13, wherein a central axis of radiation of each loudspeaker driver extends at an angle being non-parallel to a centerline of the head restraint.

16. The head restraint assembly of claim 13, wherein the converging angle is proportional to a distance between the central axes of the exit openings minus 90-degrees.

17. The head restraint assembly of claim 13, wherein each waveguide is connected to the loudspeaker driver at a first end and extends to a second end of the waveguide that is positioned along the forward contact surface of the head restraint.

18. The head restraint assembly of claim 17, wherein the second end has an exit opening area that is at least 15% greater than a first opening area at the first end.

19. The head restraint assembly of claim 13, further comprising a pair of speaker enclosures embedded in the head restraint, one of the pair of speaker enclosures connected to each loudspeaker opposite the waveguide.

20. The head restraint assembly of claim 13, wherein the forward surface is fixed.

* * * * *